United States Patent
Weiss

(10) Patent No.: US 12,098,685 B2
(45) Date of Patent: Sep. 24, 2024

(54) METHOD FOR THE ROBUST IDENTIFICATION OF KNOCKING IN AN INTERNAL COMBUSTION ENGINE, CONTROL DEVICE, AND MOTOR VEHICLE

(71) Applicant: Bayerische Motoren Werke Aktiengesellschaft, Munich (DE)

(72) Inventor: Rene Weiss, Freising (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 18/024,460

(22) PCT Filed: Sep. 29, 2021

(86) PCT No.: PCT/EP2021/076719
§ 371 (c)(1),
(2) Date: Mar. 2, 2023

(87) PCT Pub. No.: WO2022/089866
PCT Pub. Date: May 5, 2022

(65) Prior Publication Data
US 2023/0323826 A1 Oct. 12, 2023

(30) Foreign Application Priority Data

Oct. 28, 2020 (DE) ...................... 10 2020 128 281.8

(51) Int. Cl.
*F02D 35/02* (2006.01)
*F02D 13/02* (2006.01)
(Continued)

(52) U.S. Cl.
CPC ....... *F02D 35/027* (2013.01); *F02D 13/0226* (2013.01); *F02D 41/2451* (2013.01); *G01L 23/222* (2013.01)

(58) Field of Classification Search
CPC ............... F02D 35/027; F02D 13/0226; F02D 41/2451; F02D 2200/101; G01L 23/222; Y02T 10/12; Y02T 10/40
See application file for complete search history.

(56) References Cited

U.S. PATENT DOCUMENTS

2007/0185642 A1   8/2007 Grai et al.
2008/0262705 A1  10/2008 Oe et al.
(Continued)

FOREIGN PATENT DOCUMENTS

AT            517396 B1    2/2018
DE   10 2010 012 332 A1   10/2010
(Continued)

OTHER PUBLICATIONS

International Search Report (PCT/ISA/210) issued in PCT Application No. PCT/EP2021/076719 dated Jan. 13, 2022 with English translation (seven (7) pages).

(Continued)

*Primary Examiner* — Joseph J Dallo
(74) *Attorney, Agent, or Firm* — Crowell & Moring LLP

(57) ABSTRACT

A method and control device for automatically identifying knocking in an internal combustion engine, wherein, in a predefined measurement time frame, a signal of the knocking sensor is received and evaluated with respect to a criterion for detecting knocking. A basic threshold value predefined for the identification of knocking is modified by a predefined variable interference factor, which depends on a relative point in time at which an inlet valve of at least one of the cylinders closes in relation to a predefined reference point. A signal based on the sensor signal is only identified as knocking if it reaches at least the modified basic threshold value.

17 Claims, 1 Drawing Sheet

(51) Int. Cl.
  *F02D 41/24* (2006.01)
  *G01L 23/22* (2006.01)

(56) References Cited

U.S. PATENT DOCUMENTS

| | | | |
|---|---|---|---|
| 2011/0093186 A1 | 4/2011 | Hagari et al. | |
| 2011/0265453 A1* | 11/2011 | Uhrich | F01N 13/011 60/276 |
| 2011/0265454 A1* | 11/2011 | Smith | F01N 3/10 123/481 |
| 2011/0265771 A1* | 11/2011 | Banker | F02D 35/027 123/564 |
| 2011/0313641 A1* | 12/2011 | Glugla | F02P 5/1528 701/104 |
| 2012/0285161 A1* | 11/2012 | Kerns | F02P 5/152 60/598 |
| 2012/0290193 A1 | 11/2012 | Suzuki et al. | |
| 2013/0035841 A1* | 2/2013 | Glugla | F02D 41/22 701/101 |
| 2013/0096809 A1* | 4/2013 | Haeming | F02P 5/152 701/111 |
| 2013/0151128 A1* | 6/2013 | Ono | F02P 5/152 701/111 |
| 2014/0350823 A1* | 11/2014 | Glugla | F02D 41/0087 701/104 |
| 2015/0128683 A1 | 5/2015 | Kumano et al. | |
| 2015/0159573 A1* | 6/2015 | Glugla | F02P 5/045 701/103 |
| 2017/0356366 A1* | 12/2017 | Glugla | F02D 17/02 |
| 2017/0356367 A1* | 12/2017 | Glugla | F02D 41/0087 |
| 2018/0252171 A1 | 9/2018 | Spyra et al. | |
| 2018/0298871 A1 | 10/2018 | Inoue et al. | |
| 2020/0102897 A1 | 4/2020 | Glugla et al. | |
| 2020/0132008 A1 | 4/2020 | Kiwan et al. | |

FOREIGN PATENT DOCUMENTS

| | | | |
|---|---|---|---|
| DE | 11 2007 000 333 B4 | 9/2014 | |
| DE | 11 2015 002 437 T5 | 3/2017 | |
| DE | 11 2010 004 825 B4 | 10/2017 | |
| DE | 10 2016 117 155 A1 | 3/2018 | |
| DE | 10 2017 222 741 A1 | 10/2018 | |
| DE | 10 2008 042 475 B4 | 10/2019 | |
| DE | 10 2019 128 692 A1 | 4/2020 | |
| JP | 2000-130246 A | 5/2000 | |
| WO | WO-2014129389 A1 * | 8/2014 | F02D 35/027 |

OTHER PUBLICATIONS

German-language Written Opinion (PCT/ISA/237) issued in PCT Application No. PCT/EP2021/076719 dated Jan. 13, 2022 (seven (7) pages).

German-language Search Report issued in German Application No. 10 2020 128 281.8 dated Mar. 25, 2021 with partial English translation (10 pages).

* cited by examiner

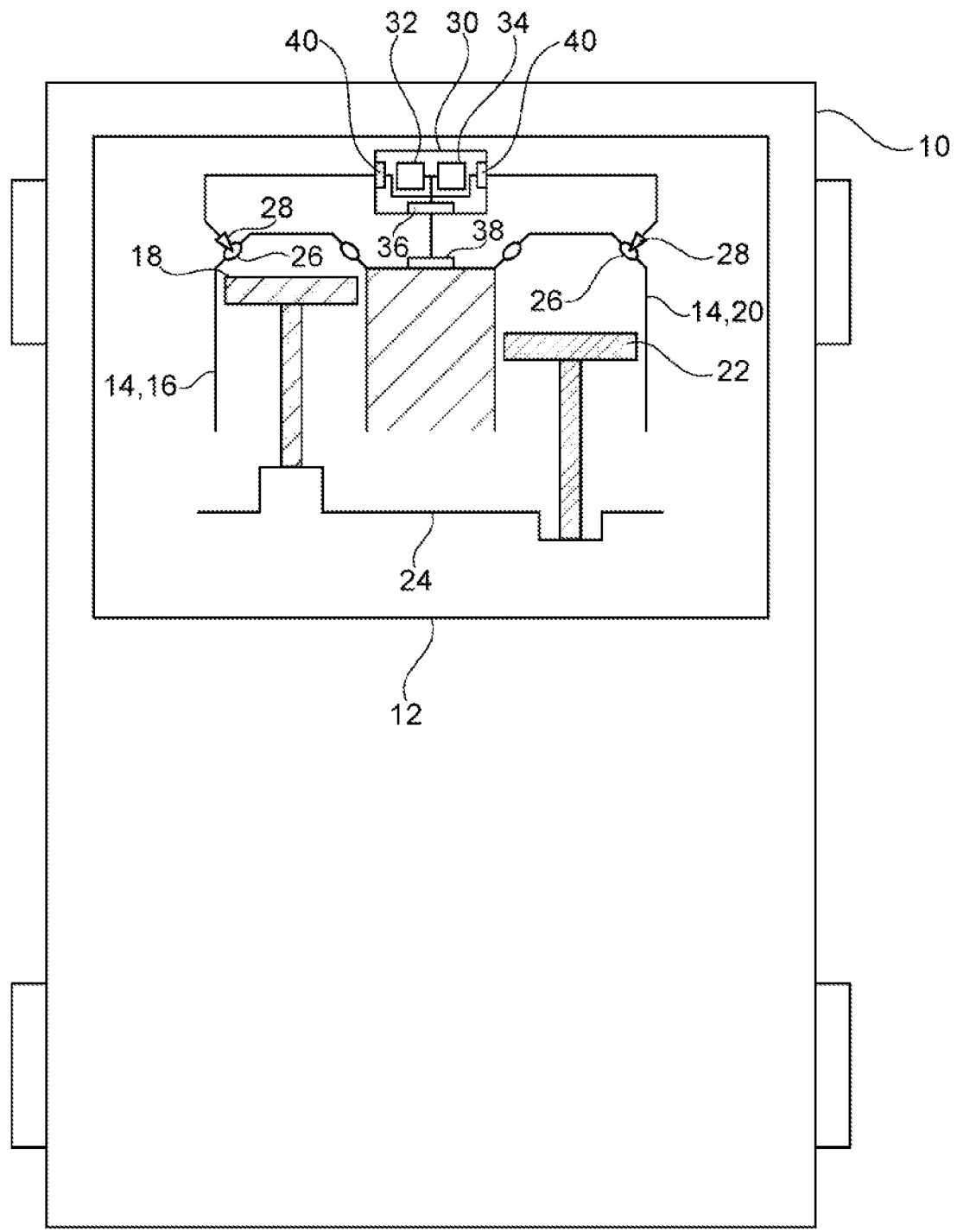

METHOD FOR THE ROBUST IDENTIFICATION OF KNOCKING IN AN INTERNAL COMBUSTION ENGINE, CONTROL DEVICE, AND MOTOR VEHICLE

FIELD

The present invention relates to a method for automatic knocking identification in an internal combustion engine, an appropriately set up control device and a motor vehicle equipped therewith.

BACKGROUND AND SUMMARY

Although internal combustion engines have been known for a long time, there is still interest in and a need for developments, for example relating to efficiency and reliability. A well-known problem is the so-called knocking, which can occur under certain conditions due to irregular or uncontrolled combustion with an additional spark plug within a cylinder volume at suitable high pressures and temperatures. Such knocking can lead to knocking damage, which can range from damage to a piston to major engine damage, i.e. to the failure of the respective internal combustion engine. There are therefore already approaches for automatic knocking identification by means of appropriate knocking sensors, which can, for example, detect acoustic signals caused by knocking. If knocking is detected, for example, an ignition angle or ignition time can be adjusted to avoid further knocking. However, it can be problematic that a knocking sensor can detect signals not only caused by actual knocking, but also a large number of external or control signals from other sources, making reliable detection of knocking more difficult.

A method for knocking control of an internal combustion engine having at least one cylinder is described, for example, in AT 517 396 B1. The at least one cylinder is assigned an inlet valve, wherein when knocking occurs in at least one cylinder, by actuating the inlet valves assigned to the cylinder identified as knocking the temperature of the charge of this cylinder is lowered in such a way that the knocking in this cylinder is reduced. During this actuation of the inlet valve belonging to the cylinder identified as knocking, a cylinder-specific and/or a global measure for power compensation of the internal combustion engine is taken. In this case, for example, the respective inlet valve may be closed earlier in the induction stroke by means of a variable valve train. Similarly, the temperature of the cylinder charge can be lowered to avoid knocking by supplying the cylinder in question with an increased amount of cooled exhaust gas. In particular, a loss of efficiency in the context of knocking control is to be prevented.

DE 11 2015 0 02 437 T5 discusses valve fault detection. For this purpose, a method is described in which an engine having several cylinders is operated in a cylinder cut-off mode. By means of a torque model, a useful torque to be expected during an operating window is estimated. In addition, a parameter indicating the actual engine torque during the operating window is measured. Based on a comparison of the measured parameter with an expected parameter value based on the expected useful torque, it is determined within an engine cycle whether a valve actuation error has occurred. As part of this method, an accelerometer can also be used as a knocking sensor. Knocking can lead to a corresponding vibration pattern of the engine and thus to a vibration pattern in an output signal of the accelerometer with a signature associated with the knocking. Thus, the engine knocking can be detected by searching for knocking signatures in a suitable frequency range.

In DE 11 2010 004 825 B4, an internal combustion engine control arrangement is described which provides an inlet pipe temperature transient behavior calculation means for estimating the transient behavior of an inlet pipe temperature on the basis of a flow rate of gas flowing into an inlet pipe, a flow rate of gas flowing out of the inlet pipe, an inlet pipe pressure and a rate of change against time of the inlet pipe pressure. As a result, an internal combustion engine control device will be created capable of accurately estimating the behavior of the inlet pipe temperature during a transient period, even in an internal combustion engine with variable valves or a turbocharger. This allows transient knocking to be suitably prevented, for example, by calculating the timing at the time during the transient period of the combustion engine on the basis of the estimated transition behavior of the inlet pipe. As a result the problem that an empirical determination of a corrective measure for a suitable prevention of temporary knocking is too costly is overcome, since in typical internal combustion engines a variety of actuators operate, which can lead to an abundance of superimposed acceleration patterns.

It is an object of the present invention to enable a particularly reliable or robust knocking identification of an internal combustion engine.

This object is achieved according to the invention by the subject matter disclosed herein. Possible embodiments and developments of the present invention are specified in the description and in the drawing.

The method according to the invention is used for automatic knocking identification in an internal combustion engine having several cylinders, a variable inlet valve stroke and at least one knocking sensor. The internal combustion engine may, for example, be a propulsion engine of a motor vehicle. With the method the internal combustion engine is operated with an inlet valve closure still during each induction stroke, i.e. before the end of the induction stroke. Thus, the inlet valves of the cylinders are already closed before a bottom dead center or reversal point of their respective piston or a respective associated connecting rod and crankshaft. A compression within the cylinders in this mode is therefore smaller than a respective expansion in the following work cycle. For example, the internal combustion engine can be operated in the so-called Miller cycle or Miller mode. Furthermore, with the method according to the invention, a sensor signal recorded in a predetermined measurement time window by the knocking sensor is evaluated with regard to a predetermined criterion for detecting knocking. The measurement time window is shorter than a respective period or cycle times of the internal combustion engine. For example, the measurement time window can extend over an angular range between 30° and 60° in relation to a rotary movement of a crankshaft of the internal combustion engine.

There may also be several measurement time windows predefined, for example a pre-ignition measurement time window and a main measurement time window, which can partially overlap or connect to each other. The specified measurement time window can, for example, begin at about a 20° crankshaft angle or crankshaft movement after a respective top dead center of the cylinders. The measurement time windows of the several cylinders can therefore be considered in absolute terms, i.e. at the same time in relation to their respective top dead centers, but can start at different times. The fact that only the sensor signal recorded in the respective measurement time window is evaluated for the detection or identification of knocking allows particularly effective and efficient knocking identification, since, for example, the data processing effort is limited and external or noise signals lying outside the respective measurement time window in which knocking can occur automatically remain unconsidered. In order to detect knocking, the sensor signal or a signal based on the sensor signal or an output of the knocking sensor must reach or exceed at least a predetermined basic threshold value. As a result, a large part of unavoidable external or interference noise and noise which may originate from the operation of the internal combustion engine, for example possibly from components surrounding this and/or from other external influences, can be effectively filtered out.

However, it has been shown that due to the mutually phase-shifted movement of the cylinders relative to each other, an inlet valve closure, i.e. a time of closure of an inlet valve, of a cylinder can occur in the measurement time window for the knocking identification of another cylinder, especially if the internal combustion engine is operated with the mentioned early inlet valve closure or with the Miller cycle. With the method according to the invention, it is therefore provided that the basic threshold value for knocking identification is modified by means of a predetermined variable interference factor, which depends on a relative time of a closure of an inlet valve of at least one of the cylinders relative to a predefined reference point. This reference point can be, for example, a defined reference time or a reference event or the time thereof, for example the respective top dead center. The relative time of the inlet valve closure can then be given, for example, by a certain crankshaft angle after the predetermined reference point, wherein a respective current revolution rate of the internal combustion engine can also be taken into account. The reference point can, for example, indicate when a maximum stroke or a null position is reached in the respective cylinder, i.e. in general a position or situation of the crankshaft or of a respective piston. In order to detect the reference point, a corresponding sensor can be provided, for example a sensor wheel or similar.

In order to modify the basic threshold value, this can be multiplied, for example, by the respective interference factor, wherein the interference factor may be in particular greater than 1. The resulting modified basic threshold value can therefore in particular be greater than the originally predetermined basic threshold value. By means of the interference factor it can be taken into account here that the closure of an inlet valve can generate a signal detectable by the knocking sensor, for example an acoustic signal or a vibration signal, in at least one part of the internal combustion engine and in the Miller mode of the internal combustion valve the inlet valve closure of a cylinder can occur during the measurement time window for the regular knocking identification of another cylinder. Thus, the inlet valve closure of one cylinder can disrupt or affect the knocking identification of another cylinder. Since the inlet valve stroke of the internal combustion engine is variable and accordingly the inlet valve closure can occur at different relative times depending on the actuation, a particularly accurate, reliable and robust knocking identification can ultimately be achieved due to the corresponding variability of the interference factor. Since the inlet valve closure is controlled, its respective time is substantially known, and so can be easily used or taken into account within the framework of knocking identification, for example by a suitably set up control device.

Furthermore, with the method according to the invention, the sensor signal or the signal based thereon is identified as knocking, i.e. as a signal caused by an uncontrolled combustion in the respective cylinder, only if it at least reaches or exceeds the suitably modified basic threshold value.

The present invention is based, inter alia, on the finding that even in the described manner of operation or the described operating mode, the regular knocking identification can be disrupted or influenced to correspondingly different degrees or in different ways due to the correspondingly early inlet valve closure and by the fact that the inlet valve closure can be carried out at different relative times by means of the variable inlet valve stroke, i.e. a corresponding valve train control. The traditional use of the constant basic threshold value could therefore lead to false positives of knocking identification or signals or events or, if the basic threshold value is set too high, to non-identification of real knocking. A false positive identification of knocking could, by means of corresponding control of the internal combustion engine, then lead to unjustified ignition angle retractions and thus to an ultimately unnecessary increase in consumption, emissions and component loads due to increased exhaust gas temperatures and to a negative influence on the driving behavior of a motor vehicle equipped with the internal combustion engine. Non-detection of actual knocking, on the other hand, can lead to increased knocking damage, for example to damage to the pistons or a complete failure of the internal combustion engine. These problems can be avoided or reduced by the present invention.

In order to detect the signals mentioned, the knocking sensor may comprise a piezo element which outputs a voltage, i.e. a voltage signal, as the sensor signal. This voltage varies with sound waves or vibrations incident on the knocking sensor or piezo element. Although for the sake of simplicity the invention is described here only with reference to a single knocking sensor, several knocking sensors can be spatially distributed on the internal combustion engine and their signals used in a suitable manner, i.e. evaluated. For example, a respective knocking sensor may be provided for each cylinder or for each adjacent cylinder, for example.

The evaluation of the sensor signal described here and thus the knocking identification can be carried out in every cycle, i.e. in every work cycle of the engine or the individual cylinders.

In a possible embodiment of the present invention, the sensor signal is filtered by means of a predetermined band-pass filter for the evaluation. The resulting filtered sensor signal is then integrated over the measurement time window, i.e. its time or duration. A resulting integral value is then compared with the modified basic threshold value. This is a practical option for relatively easy implementation of a signal-based knocking identification. It may also be possible to divide the measurement time window into several parts or sections, for which this method is applied individually. Depending on the relative time of the inlet valve closure, the modified basic threshold value may then be used as a benchmark for knocking identification for one or more of these parts or sections and the original basic threshold value can be used as a benchmark for knocking identification for the remaining parts or sections. This makes it particularly easy and effective to ensure that the inlet valve closure and the interference signal caused by it does not necessarily occur over the entire measurement window. As a result a further improved, i.e. more accurate or more reliable knocking identification may be achieved.

In a further possible embodiment of the present invention, an individual interference factor is specified for each cylinder and taken into account for the evaluation. This makes it possible to take into account that different cylinders nay have different acoustic properties or vibration properties, for example due to microscopic differences in the area of the inlet valves, material differences, manufacturing tolerances, a relative arrangement of the knocking sensor and/or the like. Each cylinder can therefore have an individual signal characteristic, which can be taken into account by the correspondingly adjusted individual interference factor. For example, a standard interference factor may initially be specified for all cylinders, which can be individually adjusted for each cylinder depending on measured values or sensor signals of the knocking sensor. Overall, the knocking identification can be further improved in this way.

With a further possible embodiment of the present invention, an adaptive mechanism is used for the identification of a signal as knocking, which is set up to learn external signals over time, i.e. external noise or interference noise which are not caused by actual knocking, i.e. which are not generated by uncontrolled combustion in one of the cylinders, and to leave them unconsidered for the detection of knocking. The mechanism for knocking identification can detect external signals, for example, based on their time or time intervals of a respective occurrence of the external signals, which do not correlate with the relative temporal position of the measurement time window or a corresponding change, based on peak shapes or signal shapes and/or the like. For example, an external signal with constant frequency can also occur over varied revolution rates of the internal combustion engine or always at exactly the same time interval from a certain predetermined reference point, which is not consistent with knocking as the cause. For example, identified external signals can be automatically filtered out of the sensor signal before further evaluation, i.e. the actual knocking identification, is carried out based on a residual signal. The adaptive mechanism can be realized, for example, as a learning algorithm or as a machine learning device. In this way, knocking identification can be automatically improved, especially against the background that corresponding manual programming of knocking identification with all actual or potentially occurring external signals in advance is not practicable.

In a possible development of the present invention, the interference factor is reduced in a predetermined manner, in particular gradually or stepwise, with increasing adaptation of the mechanism for knocking identification. In other words, the interference factor, or its application to the basic threshold value, is increasingly ignored over the course of an operating period of the internal combustion engine during which the mechanism is learning to identify external signals. This can, for example, be implemented according to a predetermined ramp function or the like. As a result, it can be taken into account that the adaptive mechanism also learns the disturbances or interference signals caused by the inlet valve closure as external signals, i.e. it recognizes them. Due to the appropriately trained adaptive mechanism, a false positive identification of knocking can then be avoided or reduced. At the same time, the basic threshold value can be reduced to the originally specified basic threshold value due to the stepwise or gradual reduction of the interference factor, which can reduce the risk of non-identification of for example relatively weakly distinctive knocking.

In a possible development of the present invention, a rate of reduction of the interference factor, or of the application thereof to or the influence thereof on the basic threshold value, varies as a function of a revolution rate of the internal combustion engine. The reduction of the interference factor can therefore be accelerated or slowed down within a corresponding reduction phase. For example, in the case of lower revolution rate, especially with relatively high load at the same time, the reduction, i.e. the ramping down, of the interference factor can be slowed down. The design proposed here is based on the recognition that the disturbances of knocking identification caused by the inlet valve closure may be more serious or relevant in such operating conditions of the internal combustion engine than for higher revolution rates and/or lower load.

In a further possible embodiment of the present invention, the interference factor is modified by a predetermined run time factor, which increases with increasing operating time of the internal combustion engine or with increasing number of work cycles carried out or passed through by the internal combustion engine and reduces the interference factor correspondingly. In other words, the interference factor is reduced to an ever greater extent as the operating time or the number of work cycles carried out or passed through by the internal combustion engine increases. As a result, it can be taken into account that the inlet valves develop chipping, burrs, bumps or mismatches in the valve seats thereof over time, which can generally result in an adjustment or ageing process of the inlet valves. As a result, with increasing operating time, the interference effect of the inlet valve closure on knocking identification can decrease. Due to the predetermined run time or operating time based modification of the interference factor, reliable and robust knocking identification can thus be maintained over time, although a corresponding characteristic of the internal combustion engine can change in the process.

With a further possible embodiment of the present invention, in particular, a variable hysteresis factor is predetermined for the evaluation, which takes into account that an interference signal caused by the inlet valve closure in a respective cylinder, which affects the sensor signal received by the knocking sensor, covers an interference period which can shift relative to the measurement time window for the knocking identification, i.e. can be displaced in time relative to this. The hysteresis factor defines the part of the measurement time window for which the interference factor is to be used or to what extent it is to be applied. In other words, the inlet valve closure does not or does not always produce a sharply defined single peak, but can be characterized as, i.e. described by, a common signal shape optionally comprising or enveloping several peaks. This can be caused, for example, by an asymptotic seating of the inlet valves on their respective valve seats or a vibration of the valve occurring during the approach to and/or after initial contact with the valve seat. Since the seating of an inlet valve on its respective valve seat is not always carried out in exactly the same way, the signal shape generated thereby can migrate wholly or partially into or out of the measurement time window. This can also be determined or influenced by the relative time of the inlet valve closure, i.e. a corresponding spread. Due to the hysteresis factor, this can be taken into account and thus the knocking identification can be made yet more accurate, reliable and robust.

Another aspect of the present invention is a control device for an internal combustion engine, in particular of a motor vehicle, for automatic detection, i.e. identification of a knocking of the internal combustion engine or in at least one cylinder of the internal combustion engine. The control device has an input interface for acquiring a sensor signal from a knocking sensor, a data memory and a connected processor device for processing the sensor signal and an output interface for issuing a detection signal indicating a detection of knocking. The control device is set up for in particular automatic implementation of at least one variant or embodiment of the method according to the invention. For this purpose, a corresponding program code or a corresponding computer program which represents, i.e. codes or implements, the procedural steps, sequences or measures of the corresponding method, may be stored in the data memory. This computer program may then be executed by the processor device to cause the corresponding method to be carried out or executed.

Another aspect of the present invention is a motor vehicle comprising an internal combustion engine having several cylinders, a variable inlet valve stroke, at least one knocking sensor and a control device according to the invention. In other words, the motor vehicle according to the invention may therefore be set up for executing or applying the method according to the invention. In particular, the motor vehicle according to the invention may be the motor vehicle mentioned in connection with the other aspects of the invention.

Accordingly, the parts or components mentioned in relation to the various aspects of the present invention, i.e. the method according to the invention, the control device according to the invention and the motor vehicle according to the invention, may be similar or the same parts or components, or may relate to similar or the same parts or components.

Further features of the invention may result from the claims, the figures and the description of the FIGURE. The features and feature combinations mentioned above in the description as well as the features and feature combinations shown below in the description of the FIGURE and/or in the FIGURE alone are not only able to be used in the respective combination indicated but can also be used in other combinations or on their own without departing from the scope of the invention.

BRIEF DESCRIPTION OF THE DRAWING

FIG. 1 shows a schematic representation of a motor vehicle with knocking identification in the single FIGURE.

DETAILED DESCRIPTION

FIG. 1 shows a schematic representation of a motor vehicle 10 with an internal combustion engine 12, which may be in particular a gasoline engine which operates or can be operated with an inlet valve closure before the end of the induction stroke in each cycle, i.e. in particular in the Miller cycle or in Miller mode. The internal combustion engine 12 comprises several, for example four or six, cylinders 14, two of which are indicated here by way of example. Specifically, these are a first cylinder 16 with a first piston 18 and a second cylinder 20 with a second piston 22. The pistons 18, 22 are connected here to a schematically indicated crankshaft 24. By way of example, the first piston 18 is near an ignition position here, while the second piston 22 is on its way to its bottom dead center.

The cylinders 14 each have an inlet valve 26 with a controlled variable valve train 28. The variable valve trains 28 are connected to a control device 30 for control.

The control device 30 schematically indicated here comprises a data memory 32 and a connected processor 34 for executing an operating or control program stored in the data memory 32. The processor 34 may, for example, be and/or comprise a microchip, a microprocessor, a microcontroller, a hardware circuit and/or the like. The control device 30 further comprises an input interface 36, via which a knocking sensor 38 of the internal combustion engine 12 is connected. Via the input interface 36, therefore, the control device can acquire a sensor signal received or provided by the knocking sensor 38 for processing by means of the processor 34 and the data memory 32.

The control device 30 is set up for knocking identification based on the detected sensor signal of the knocking sensor 38. If knocking is identified, the control device 30 may, for example, control the inlet valves 26 or the variable valve trains 28 thereof via an output interface 40 in order to avoid or reduce further knocking.

Especially in the case of turbocharged gasoline engines, a significant disturbance of the identification or detection of gasoline engine knocking can occur in conjunction with the Miller cycle, i.e. in the Miller combustion process, due to the premature inlet valve closure. The inlet valve closure, in the present case, for example, the closing of the inlet valve 26 of the second cylinder 20, can cause structure-borne sound. This structure-borne sound due to seating of the inlet valve 26 in its valve seat and/or to mechanical relaxation of the variable valve train 28 during closing of the inlet valve 26 can lead to a corresponding interference signal in the sensor signal of the knocking sensor 38, since the structure-borne sound or an acoustic signal originating from the inlet valve 26 can reach the knocking sensor 38, for example by appropriate propagation or transport in a housing or component of the internal combustion engine 12 on which the knocking sensor 38 is arranged. Such an interference signal can have a significant negative influence on knocking identification, so that such interference signals should be largely eliminated or filtered out for accurate, reliable and robust knocking identification. In the present case, this is achieved by the suitably set up control device 30 by automatic processing of the sensor signal of the knocking sensor 38.

In the present case, a command variable may be predetermined for this purpose, which results in a respective time of inlet valve closure of the inlet valves 26 based on the profile of a camshaft of the internal combustion engine 12 and a respective current spread by means of which a basic position of the camshaft is defined. This can be carried out, for example, by means of a current angular position of the crankshaft 24 relative to a respective top dead center. Depending on this command variable, i.e. a respective point in time at which the intake valve closes, a cylinder-specific interference factor can be applied to a predefined basic threshold value, i.e. a knocking threshold for knocking identification in a predefined measurement time window, for example in a main measurement time window and in a pre-ignition measurement time window. For this purpose, for example, a corresponding characteristic map regarding a relative cylinder filling and a revolution rate of the internal combustion engine 12 may be predetermined, for example stored in the data memory 32. That pre-ignition measurement time window can begin, for example, approximately at the top dead center at a crankshaft angle of 0° and can extend for example over a crankshaft movement of 20°. Following or overlapping this, the main measurement time window can extend, for example, up to a crankshaft angle of 60° to 70°.

By means of a hysteresis value, a respective time of the inlet valve closure or a migration of the interference signal caused by the inlet valve closure relative to the measurement window can be taken into account. The hysteresis value can be interpreted as a characteristic value for an angular position of the crankshaft 24, which defines or takes into account where the interference signal extends or how this occurs or moves in time relative to the measurement time window. In this way, it can be taken into account that the inlet valve closure is never completely constant, but ultimately only the region defined by the predetermined measurement time window is taken into account for knocking identification.

The initially applied cylinder-specific interference factor can be reduced depending on time, i.e. can be ramped down out of the signal processing, especially if an adaptive or learning mechanism is used for the knocking identification. Such a mechanism can, in the course of time, learn and filter out secondary noise and noise not caused by actual knocking or an effectively unavoidable background noise in the operation of the internal combustion engine 12 or can leave them unconsidered during the actual knocking identification. Such ramping down, i.e. gradual or stepwise reduction, can take place, for example, over some 100 work cycles of the internal combustion engine 12. Here the ramping down of the interference factor can be varied depending on a current revolution rate of the internal combustion engine 12, i.e. it can be slowed down or accelerated. For example, a corresponding characteristic curve against the revolution rate can be predetermined, in particular can be deposited in the data memory 32.

Likewise, the interference factor can be modified, for example multiplied, by means of a predetermined run time factor which takes aging into account, i.e. a temporal change, and increasingly reduces the interference factor with increasing operating time or aging of the internal combustion engine 12. An actual operating time or an actual number of completed cycles of the internal combustion engine 12 is relevant here and not an operating time of the motor vehicle 10. The run time factor could thus be reset for the motor vehicle 10, for example in the event of replacement of the internal combustion engine 12 or the inlet valves 26.

Overall, the examples described show how a reduction of an influence of a mechanical interference variable—here the inlet valve closure—on knocking identification during the evaluation of gasoline engine combustion can be realized.

LIST OF REFERENCE SIGNS 10 motor vehicle
12 internal combustion engine
14 cylinder
16 first cylinder
18 first piston
20 second cylinder
22 second piston
24 crankshaft
26 inlet valve
28 variable valve train
30 control device
32 data memory
34 processor
36 input interface
38 knocking sensor
40 output interface

The invention claimed is:

1. A method for automatic knocking identification in an internal combustion engine with a plurality of cylinders, a variable inlet valve stroke, and a knocking sensor, the method comprising:
operating the internal combustion engine with an inlet valve closure before an end of an induction cycle;
acquiring a sensor signal representing an acoustic signal or a physical vibration signal in a predetermined measurement time window by the knocking sensor;
evaluating the sensor signal with regard to a predetermined criterion for detecting knocking, the evaluating further comprising determining that a signal based on the sensor signal reaches at least a predetermined basic threshold value to be identified as knocking;
modifying the basic threshold value to create a modified basic threshold value using a predetermined variable interference factor that is dependent on a relative time of a closure of an inlet valve of at least one of the plurality of cylinders relative to a predetermined reference point;
identifying the signal as knocking only if it at least reaches the modified basic threshold value; and
adjusting inlet valves or a variable valve train in response to identifying the signal as knocking in order to avoid or reduce the knocking.

2. The method according to claim 1, further comprising:
filtering the sensor signal using a predefined bandpass filter to create a filtered sensor signal;
integrating the filtered sensor signal over the measurement time window to create an integral value; and
comparing the integral value with the modified basic threshold value.

3. The method according to claim 1, further comprising:
using an individual interference factor specified for each cylinder of the plurality of cylinders for the evaluation.

4. The method according to claim 1, further comprising:
using an adaptive mechanism for the identification of a signal as knocking, wherein the adaptive mechanism learns, over time, external signals that are produced by something other than knocking and disregards the external signals for the identification of knocking.

5. The method according to claim 4, further comprising:
reducing the variable interference factor in a predetermined way with increasing adaptation of the adaptive mechanism.

6. The method according to claim 5, further comprising:
varying a rate of reducing the interference factor as a function of a revolution rate of the internal combustion engine.

7. The method according to claim 1, further comprising:
modifying the variable interference factor by a predetermined run time factor, wherein the predetermined run time factor increases with increasing operating time of the internal combustion engine and reduces the interference factor accordingly.

8. The method according to claim 1, further comprising:
using, as part of the evaluating, a hysteresis factor that takes into account that an interference signal caused by a closure of an inlet valve of one of the plurality of cylinders, which affects the sensor signal received by the knocking sensor, covers an interference period that can be shifted relative to the measurement time window for knocking identification, and defines the subregion of the measurement time window for which the interference factor is to be used.

9. A control device for an internal combustion engine for automatic detection of knocking, comprising:
an input interface for acquiring a sensor signal of a knocking sensor, wherein the sensor signal represents an acoustic signal or a physical vibration signal;
a data memory;
an output interface for outputting a detection signal indicating a detection of knocking; and
at least one processor device configured to:
receive the sensor signal from the input interface in a predetermined measurement time window;
evaluate the sensor signal with regard to a predetermined criterion for detecting knocking at least by determining that a signal based on the sensor signal reaches at least a predetermined basic threshold value to be identified as knocking;

modify the basic threshold value to create a modified basic threshold value using a predetermined variable interference factor that is dependent on a relative time of a closure of an inlet valve of at least one of a plurality of cylinders relative to a predetermined reference point, wherein the closure of an inlet valve occurs before an end of an induction cycle;

identify the signal as knocking only if it at least reaches the modified basic threshold value; and adjust inlet valves or a variable valve train in response to identifying the signal as knocking in order to avoid or reduce the knocking.

10. The control device according to claim 9, wherein the at least one processor device is further configured to:

filter the sensor signal using a predefined bandpass filter to create a filtered sensor signal;

integrate the filtered sensor signal over the measurement time window to create an integral value; and compare the integral value with the modified basic threshold value.

11. The control device according to claim 9, wherein the at least one processor device is further configured to:

use an individual interference factor specified for each cylinder of the plurality of cylinders for the evaluation.

12. The control device according to claim 9, wherein the at least one processor device is further configured to:

use an adaptive mechanism for the identification of a signal as knocking, wherein the adaptive mechanism learns, over time, external signals that are produced by something other than knocking and disregards the external signals for the identification of knocking.

13. The control device according to claim 12, wherein the at least one processor device is further configured to:

reduce the variable interference factor in a predetermined way with increasing adaptation of the adaptive mechanism.

14. The control device according to claim 13, wherein the at least one processor device is further configured to:

vary a rate of reducing the interference factor as a function of a revolution rate of the internal combustion engine.

15. The control device according to claim 9, wherein the at least one processor device is further configured to:

modify the variable interference factor by a predetermined run time factor, wherein the predetermined run time factor increases with increasing operating time of the internal combustion engine and reduces the interference factor accordingly.

16. The control device according to claim 9, wherein the at least one processor device is further configured to:

use, as part of the evaluation, a hysteresis factor that takes into account that an interference signal caused by a closure of an inlet valve of one of the plurality of cylinders, which affects the sensor signal received by the knocking sensor, covers an interference period that can be shifted relative to the measurement time window for knocking identification, and defines the subregion of the measurement time window for which the interference factor is to be used.

17. A motor vehicle, comprising:

an internal combustion engine having a plurality of cylinders;

an inlet valve configured to operate with a variable inlet valve stroke;

a knocking sensor; and the control device according to claim 9.

* * * * *